(12) United States Patent
Bundy et al.

(10) Patent No.: US 9,695,978 B2
(45) Date of Patent: Jul. 4, 2017

(54) HEAT EXCHANGER FIN STOCK LUBRICATION SYSTEM

(75) Inventors: Michael Bundy, Collierville, TN (US); David C. Crawford, Memphis, TN (US); Joseph T. Tucker, Cordova, TN (US)

(73) Assignee: CARRIER CORPORATION, Farmington, CT (US)

( * ) Notice: Subject to any disclaimer, the term of this patent is extended or adjusted under 35 U.S.C. 154(b) by 1045 days.

(21) Appl. No.: 13/123,989

(22) PCT Filed: Oct. 12, 2009

(86) PCT No.: PCT/US2009/060341
§ 371 (c)(1),
(2), (4) Date: Apr. 13, 2011

(87) PCT Pub. No.: WO2010/045142
PCT Pub. Date: Apr. 22, 2010

(65) Prior Publication Data
US 2011/0197643 A1    Aug. 18, 2011

Related U.S. Application Data

(60) Provisional application No. 61/105,285, filed on Oct. 14, 2008.

(51) Int. Cl.
*F16N 7/12* (2006.01)

(52) U.S. Cl.
CPC ...................... *F16N 7/12* (2013.01)

(58) Field of Classification Search
CPC ......... B21B 45/08; B21B 45/06; B21B 45/04; B21B 27/10; B21B 45/0251;
(Continued)

(56) References Cited

U.S. PATENT DOCUMENTS 1,700,275 A    1/1929 Willet
2,302,857 A *  11/1942 Harder ................... B21D 37/18
                                              118/315
(Continued)

FOREIGN PATENT DOCUMENTS

CN        200955650 Y    10/2007
DE         2004706 A1     8/1971
(Continued)

OTHER PUBLICATIONS

Notification of Transmittal of the International Search Report and the Written Opinion of the International Searching Authority; PCT/US2009/060341; Korean Intellecutal Property Office; Mailed Mar. 5, 2010.

(Continued)

*Primary Examiner* — David Bryant
*Assistant Examiner* — Lawrence Averick
(74) *Attorney, Agent, or Firm* — Cantor Colburn LLP

(57) ABSTRACT

Embodiments according to this disclosure include methods and systems for lubricating sheet metal stock by wiping a controlled amount of lubricant onto the surfaces of the sheet metal with strips of material, such as felt, saturated with the lubricant. The lubrication methods and systems disclosed herein can also provide for control of the pressure at which the lubricant is delivered, the volume of lubricant delivered, and the frequency lubricant is delivered to the felt strips. The lubricant is delivered to the felt strips at a number of locations and the felt material is configured to naturally wick the lubricant from the injection sites to the spaces between injection sites to substantially saturate the entire strip.

14 Claims, 4 Drawing Sheets

(58) Field of Classification Search
CPC ............ B21B 45/0239; B21B 45/0245; B21B 45/0248; B21C 43/04; B21C 9/00; B21C 23/32; B23Q 11/123; B23Q 11/121; F16N 27/00; F16N 25/02; F16N 7/12; B05C 1/04; B05C 1/06; B05D 1/28
USPC ............ 72/39, 41, 43–45; 184/6.14, 7.4, 26; 118/683, 256, 257, 264, 200, 679, 681, 118/663
See application file for complete search history.

(56) References Cited

U.S. PATENT DOCUMENTS

| | | | | |
|---|---|---|---|---|
| 2,680,938 | A | * | 6/1954 | Peterson ........................ 451/67 |
| 3,215,558 | A | * | 11/1965 | Dascher ................. B32B 15/08 118/33 |
| 3,427,840 | A | * | 2/1969 | Richter ............................ 72/44 |
| 3,548,836 | A | * | 12/1970 | Dreher .................... A24C 1/32 118/410 |
| 4,064,970 | A | * | 12/1977 | Reeves ........................ 184/15.3 |
| 4,784,578 | A | * | 11/1988 | Gruett .................. G01F 11/021 417/225 |
| 4,784,584 | A | * | 11/1988 | Gruett .................. G01F 11/021 417/399 |
| 5,079,939 | A | * | 1/1992 | Shook .............................. 72/39 |
| 5,090,225 | A | * | 2/1992 | Schimion ......................... 72/45 |
| 5,102,565 | A | * | 4/1992 | Waynick ...................... 508/164 |
| 5,690,738 | A | * | 11/1997 | Boelkins ............... B05C 1/0813 118/227 |
| 5,985,028 | A | * | 11/1999 | Cornell .................... B05C 1/06 118/227 |
| 6,361,602 | B1 | | 3/2002 | Hahn |
| 6,514,340 | B1 | | 2/2003 | Momose et al. |
| 2007/0214855 | A1 | * | 9/2007 | Hiraishi ................. B21B 19/04 72/69 |
| 2007/0227822 | A1 | * | 10/2007 | Corden et al. .................. 184/10 |

FOREIGN PATENT DOCUMENTS

| | | |
|---|---|---|
| JP | 05-056273 | 7/1993 |
| JP | 2002-346645 | 12/2002 |
| WO | 9913992 A1 | 3/1999 |

OTHER PUBLICATIONS

European Supplemental Search Report for application EP 09821068, dated Jan. 13, 2015, 5 pages.

* cited by examiner

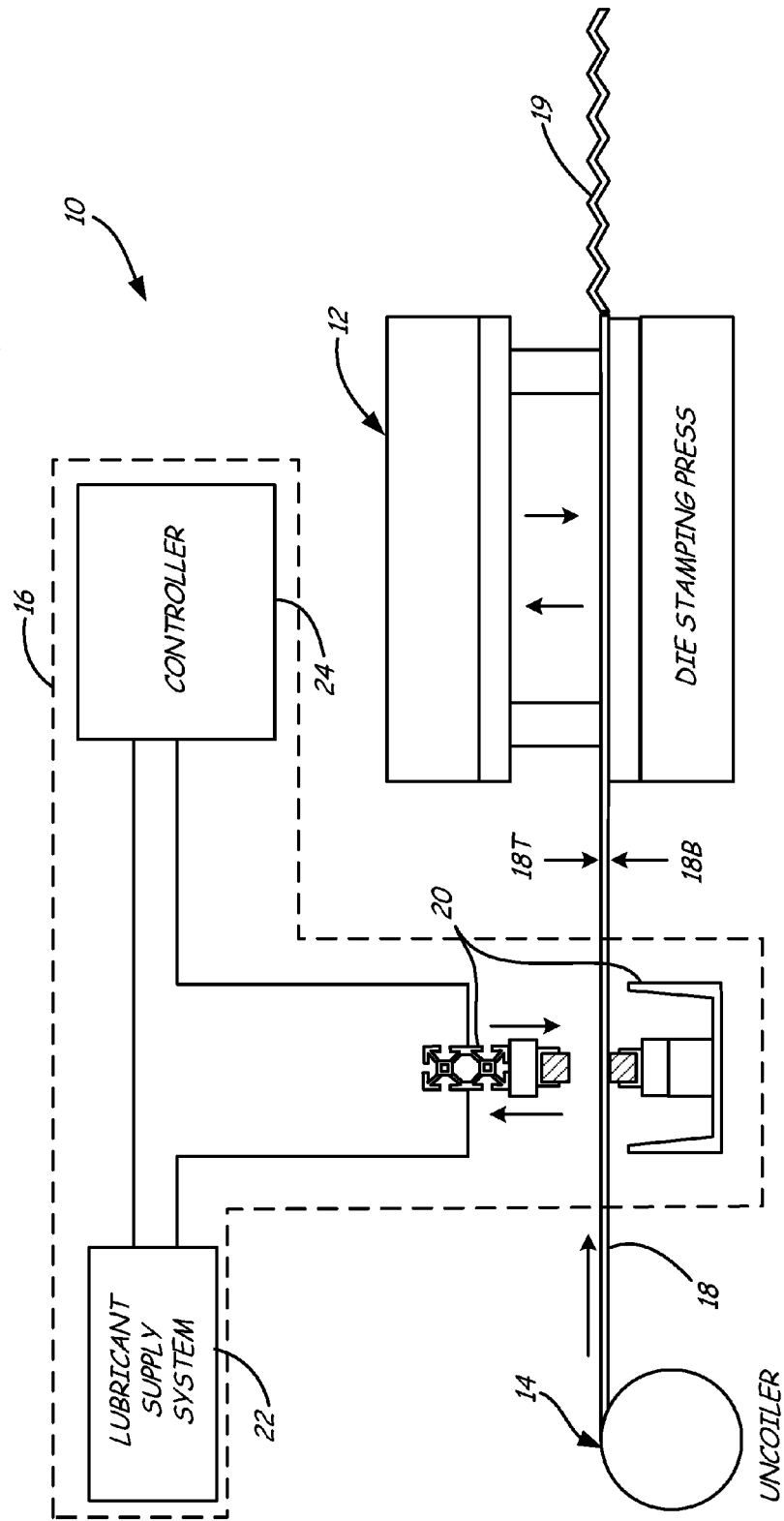

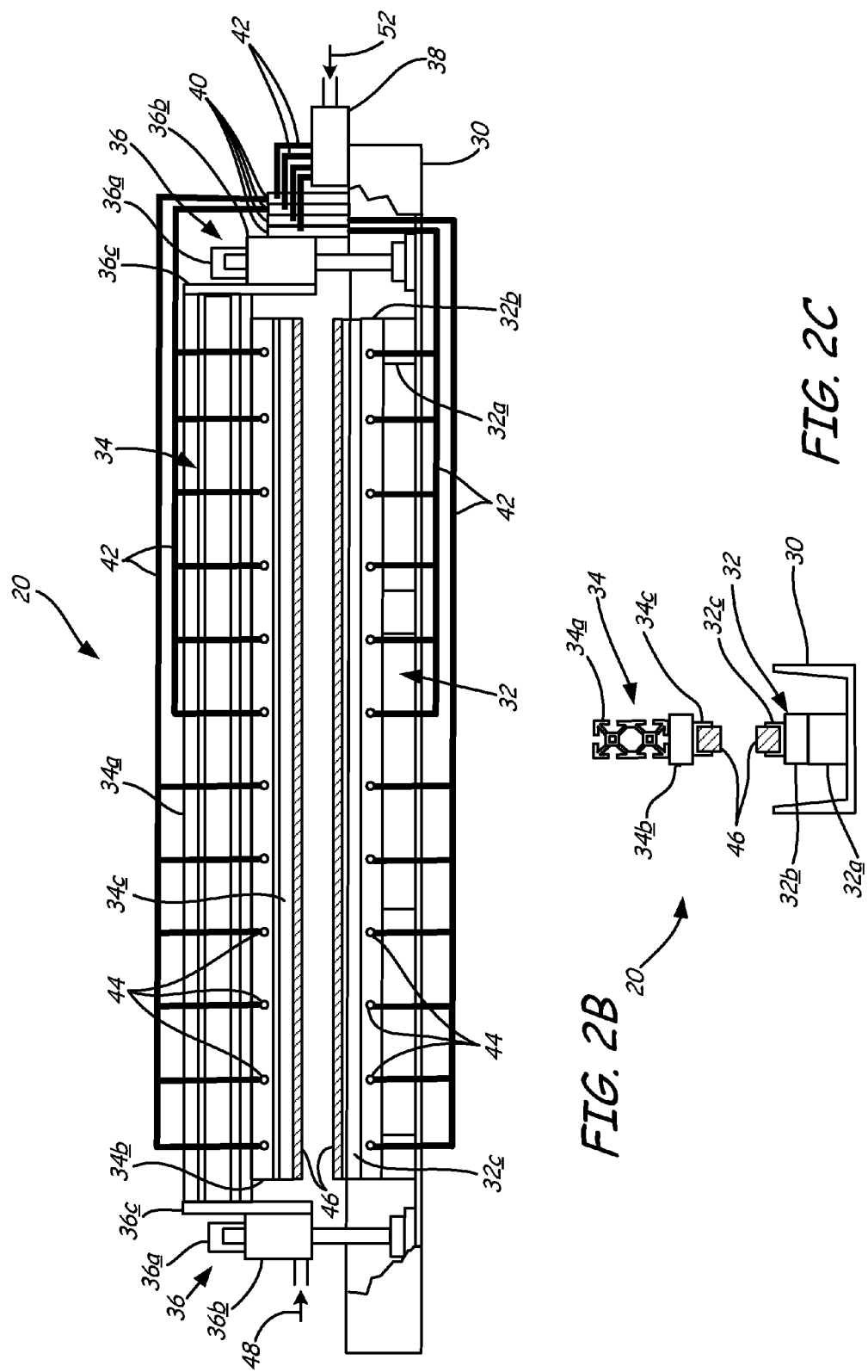

HEAT EXCHANGER FIN STOCK LUBRICATION SYSTEM

CROSS-REFERENCE TO RELATED APPLICATION

This application claims priority from U.S. Provisional Application Ser. No. 61/105,285, filed Oct. 14, 2008.

BACKGROUND

Air conditioners and heat pumps commonly employ vapor-compression refrigerant systems to cool, or both cool and heat air supplied to a climate controlled comfort zone within, for example, a residence, office building, hospital, school, restaurant or other facility. Conventionally, such vapor-compression systems include a compressor, condenser, an expansion device, and an evaporator connected to one another by refrigerant lines in a closed refrigerant circuit and arranged according to the vapor-compression cycle employed (i.e. heating or cooling). The condenser and the evaporator include a heat exchanger that generally acts to add heat to or remove heat from refrigerant flowing through the devices.

Heat exchangers employed in condensers and evaporators commonly include a number of coils through which the refrigerant flows, fins connecting adjacent coils to one another, and manifolds for delivering the refrigerant to the coils. The coils may be stacked vertically or horizontally in generally parallel relationship to one another and be connected between an input manifold and an output manifold. The manifolds, sometimes referred to as headers, may be, for example, closed ended tubes configured as inlet and outlet paths for refrigerant flowing to and from the coils. Pairs of adjacent coils are connected by a number of fins distributed longitudinally between the coils. The fins structurally join the coils, as well as direct air across the coils and facilitate heat transfer between the coils and the air passing over the coils. The fins are commonly constructed from a thin piece of thermally conductive material stamped into the desired shape and cut to fit the coils of the particular heat exchanger. For example, the fins may be formed from a thin piece of sheet metal that is stamped to form a number of corrugations across the length of the sheet. The corrugated sheet may then be cut into strips, each of which may form the fins joining two adjacent heat exchanger coils.

In order to stamp the sheet metal stock into the desired fin shape, the metal must be lubricated. Prior techniques commonly lubricated the fin stock by feeding the stock through an oil bath and one or more rollers in an attempt to spread the oil evenly across the stock with a desired thickness. Such techniques are directed at removing excess oil from the stock instead of applying the correct amount of oil distributed over the stock at the correct thickness. Oil bath techniques have proven unreliable at lubricant film thicknesses less than approximately 0.0254 mm (0.001 inches). Additionally, these techniques inherently produce a significant amount of waste, as well as provide little to no control over the application process.

SUMMARY

Exemplary embodiments of the present invention include a lubrication system for heat exchanger fin stock. A head is configured to receive the fin stock. A strip of material is connected to the head and configured to absorb a lubricant and wipe the lubricant onto a surface of the fin stock. An actuator is configured to move the head into and out of engagement with the fin stock.

Exemplary embodiments of the present invention include a system for manufacturing heat exchanger fins from sheet stock. A die is configured to form the fins from the sheet stock. An uncoiler is configured to feed the sheet stock to the die. A lubrication system is interposed between the die and the uncoiler. The lubrication system includes a head configured to receive the sheet stock, a strip of material connected to the head, and an actuator configured to move the head into and out of engagement with the sheet stock. The strip of material is configured to absorb a lubricant and wipe the lubricant onto a surface of the sheet stock as it is fed from the uncoiler to the die.

Exemplary embodiments of the present invention include a method of lubricating sheet stock used to manufacture heat exchanger fins. A lubricant is delivered to a strip of material at a number of locations to substantially saturate the strip of material with the lubricant. A surface of the sheet stock is wiped with the strip of material saturated with the lubricant. A volume of the lubricant delivered to and a frequency at which the lubricant is delivered to the strip of material is controlled.

BRIEF DESCRIPTION OF THE DRAWINGS

FIG. 1 is a schematic illustrating a system for manufacturing heat exchanger fins from sheet metal stock including a lubrication system according to the present invention.

FIGS. 2A-2C are orthogonal views of the lubricating head of the lubrication system shown in FIG. 1.

DETAILED DESCRIPTION

Figure 2A:
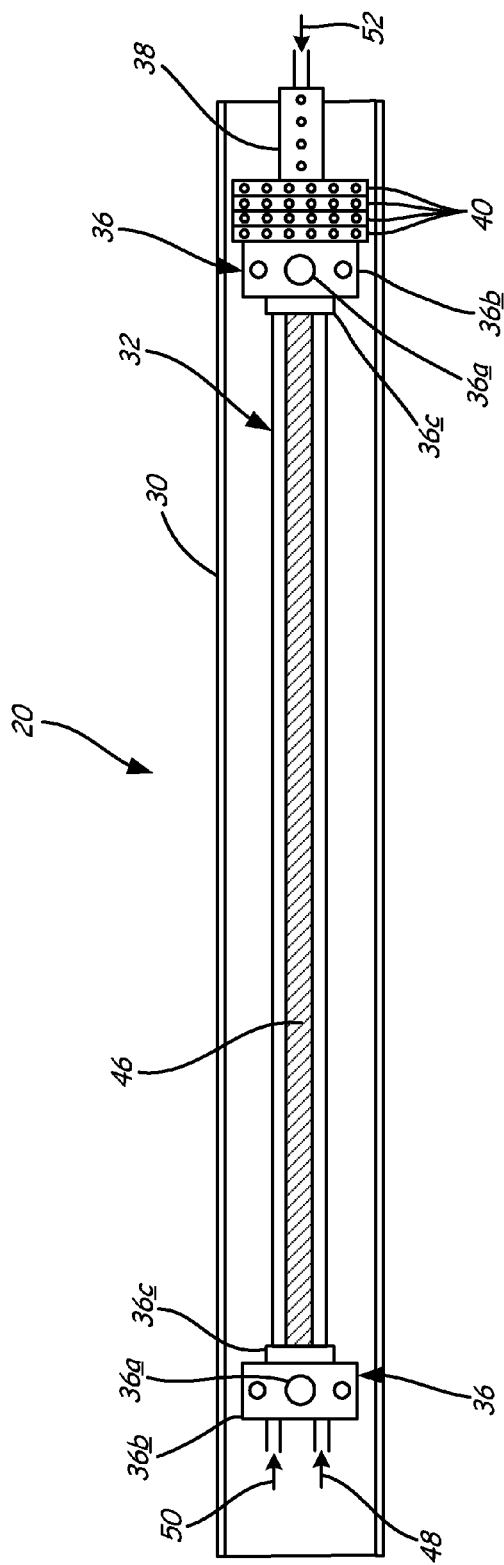

FIG. 1 is a schematic of system 10 for manufacturing heat exchanger fins from sheet metal stock, which system 10 includes die stamping press 12, uncoiler 14, lubrication system 16, and sheet metal stock 18. In FIG. 1, die stamping press 12 is configured to receive and form sheet metal stock 18 into, for example, corrugated sheet 19 from which heat exchanger fins can be constructed. Uncoiler 14 is configured to feed sheet metal stock 18 to die stamping press 12. In some embodiments, uncoiler 14 is a passive device from which press 12 is configured to pull sheet metal stock 18. Sheet metal stock 18 can be, for example, a thin sheet of aluminum from which heat exchanger fins are commonly constructed. Without proper lubrication during the stamping process, sheet metal stock 18 may gall and crack when formed to the contours of the die in die stamping press 12. Embodiments of the present invention therefore include methods and systems for lubricating sheet metal stock by wiping a controlled amount of lubricant onto the surfaces of the sheet metal with strips of material, preferably non-abrasive material such as felt, saturated with the lubricant. Embodiments according to the present invention provide for control of the pressure at which the lubricant is delivered, the volume of lubricant delivered, and the frequency lubricant is delivered to the felt strips. The lubricant is delivered to the felt strips at a number of locations and the felt material is configured to naturally wick the lubricant from the injection sites to the spaces between injection sites to substantially saturate the entire strip.

Referring again to FIG. 1, lubrication system 16 is interposed between uncoiler 14 and die stamping press 12 and is configured to lubricate sheet metal stock 18 as it is fed from uncoiler to die stamping press 12. Lubrication system 16 includes lubricating head 20, lubricant supply system 22, and controller 24. Lubricating head 20 is shown in section arranged about the top surface 18T and bottom surface 18B of sheet metal stock 18. Head 20 is configured to move down and up into and out of engagement with sheet metal stock 18. Lubricant supply system 22 is connected to and configured to deliver a lubricant, such as oil, to lubricating head 20. Controller 24 is connected to and configured to monitor and control lubricating head 20 and lubricant supply system 22. During operation, uncoiler 14 feeds sheet metal stock 18 to die stamping press 12 through lubricating system 16. Controller 24 moves head 20 down into engagement with sheet metal stock 18 and initiates lubricant supply system 22 to begin delivering the lubricant to lubricating head 20. Lubricating head 20 applies a controlled amount of lubricant to top surface 18T and bottom surface 18B of sheet metal stock 18 as it is fed from uncoiler 14 to die stamping press 12. As will be discussed in greater detail with reference to FIG. 3, controller 24 is configured to control the pressure at which the lubricant is delivered, the volume of lubricant delivered, and the frequency lubricant is delivered to head 20.

FIGS. 2A-2C are orthogonal views of lubricating head 20, which includes base 30, lower jaw 32, upper jaw 34, linear actuators 36, first manifold 38, second manifolds 40, supply lines 42, orifices 44, and felt strips 46. FIG. 2A is a top view of lubricating head 20 with upper jaw 34 and supply lines 42 removed. FIG. 2B is a front view of lubricating head 20. FIG. 2C is a section view of lubricating head 20, taken between two orifices 44. In FIGS. 2A-2C, lower jaw 32 is connected to base 30. Arranged above and in generally parallel relationship to lower jaw 32, is upper jaw 34. Upper jaw 34 is connected between linear actuators 36, which actuators 36 are connected to base 30. Air supplies 48, 50 are connected to linear actuators 36 and are separately controlled (discussed in detail below) for raising and lowering upper jaw 34. Although for clarity air supplies 48, 50 are shown connected to only one actuator 36, both actuators are supplied pressurized air and thereby function simultaneously to raise and lower upper jaw 34.

Lower jaw 32 includes mounting blocks 32a, orifice block 32b, felt channel 32c, and one felt strip 46. Mounting blocks 32a are connected to base 30 and to orifice block 32b. Orifices 44 are connected to and distributed approximately equally across the length of orifice block 32b. For example, the spacing of orifices 44 may range from about 50.8 mm (2 inches) to about 76.2 mm (3 inches). In one exemplary embodiment, twelve orifices 44 are distributed across orifice block 32b, spaced about 76.2 mm (3 inches) apart. In another exemplary embodiment, eighteen orifices 44 are distributed across orifice block 32b, spaced about 50.8 mm (2 inches) apart. Felt channel 32c is connected to orifice block 32b and felt strip 46 is mounted in felt channel 32c. Orifices 44 are arranged to deliver lubricant through orifice block 32b and felt channel 32c to felt strip 46. Upper jaw includes mounting bar 34a, orifice block 34b, felt channel 34c, and one felt strip 46. Mounting bar 32a is connected between actuators 36 and to orifice block 34b. Orifices 44 are connected to and distributed approximately equally across the length of orifice block 34b. Felt channel 34c is connected to orifice block 34b and felt strip 46 is mounted in felt channel 34c. Orifices 44 are arranged to deliver lubricant through orifice block 34b and felt channel 34c to felt strip 46. Orifices 44 in upper and lower jaws 34, 32 can be spaced in standard increments including, for example, 50.8 mm (2 inches) or 76.2 mm (3 inches) between each adjacent orifice 44. Orifices 44 can be spaced apart at increments to allow for even distribution of the lubricant through felt channel 34c and felt strip 46 so that lubricant is wiped evenly onto top surface 18T and bottom surface 18B of sheet metal stock 18. While exemplary embodiments have spacing between about 50.8 mm (2 inches) and about 76.2 mm (3 inches) between adjacent orifices 44, the spacing can vary depending on the type of felt used in felt strip 46 and the desired lubricant film thickness applied to sheet metal stock 18.

Actuators 36 can be, for example, pneumatic linear actuators each of which includes pneumatic cylinder 36a, linear slide 36b, and mounting plate 36c. Mounting plate 36c is connected to mounting bar 34a of upper jaw 34. Linear slide 36b is connected to base 30 and mounting plate 36c. Cylinder 36a is operatively connected to linear slide 36b. Pressurized air can be delivered to cylinder 36a through air supply 48 at a first pressure to, for example, raise cylinder 36a. Cylinder 36a raises linear slide 36b, which in turn raises mounting plate 36c thereby raising upper jaw 34. Similarly, pressurized air can be delivered to cylinder 36a through air supply 50 at a second pressure to, for example, lower cylinder 36a. Cylinder 36a lowers linear slide 36b, which in turn lowers mounting plate 36c thereby lowering upper jaw 34. Linear slide 36b can include, as generally shown in FIGS. 2A and 2B, a bearing block configured to receive and be guided along two shafts connected to base 30. Alternative embodiments of the present invention can employ different types of linear actuators including, for example, electrical linear actuators driven by, for example, screw or worm gear electric motors.

First manifold 38 and second manifolds 40 are connected to base 30. In one exemplary embodiment, four second manifolds 40 are connected to base 30. In another exemplary embodiment, six second manifolds 40 are connected to base 30. The location of and component to which first and second manifolds 38, 40 are connected can vary depending on, for example, space constraints of the manufacturing system in which lubrication system 16 is employed. Alternative embodiments therefore include lubrication systems with manifolds mounted to, for example, upper jaw 34. Additionally, alternative embodiments can have more or fewer manifolds including, for example, a single manifold configured to split the lubricant supply into a number of lines for delivery to orifices 44 and thereby felt strips 46. Lubricant supply 52 is connected to first manifold 38. First manifold 38 splits lubricant supply four ways and delivers the lubricant through supply lines 42 to second manifolds 40. Each of second manifolds 40 splits the lubricant supplied from first manifold 38 six ways and delivers the lubricant through supply lines 42 to six orifices 44. The split configuration and the number of orifices 44 supplied by each second manifold 40 can vary depending on the number of second manifolds 40 and the number of orifices 44. Two of second manifolds 40 deliver lubricant to orifices 44 on upper jaw 34 and two of second manifolds 40 deliver lubricant to orifices 44 on lower jaw 32.

During operation as sheet metal stock 18 is fed through lubricating head 20, lower jaw 32 remains stationary and actuators 36 lower upper jaw 34 into engagement with stock 18. Lowering upper jaw 34 sandwiches stock 18 between upper and lower jaws 34, 32 and thereby two felt strips 46. Linear actuators 36 are configured to press upper jaw 34 against sheet metal stock 18 at a prescribed pressure, e.g., the second pressure described above. Lubricant is delivered by lubricant supply 52 to first manifold 38. First manifold 38 delivers the lubricant through supply lines 42 to second manifolds 40. Second manifolds deliver the lubricant, again through supply lines 42, to orifices 44 in orifice blocks 34b, 32b, in upper and lower jaws 34, 32. Orifices 44 are configured to deliver a metered amount of lubricant through orifice blocks 34b, 32b and felt channels 34c, 32c to felt strips 46. Felt strips 46 naturally wick the lubricant from the injection sites of orifices 44 to substantially saturate all of felt strips 46 with the lubricant. As sheet metal stock 18 is fed from uncoiler 14 to die stamping press 12 through lubricating head 20, felt strips 46 wipe the lubricant onto top surface 18T and bottom surface 18B of stock 18. One type of felt appropriate for use with embodiments of the present invention is F3 veined felt manufactured by US Felt Company Inc. of Sanford, Me. The F3 veined felt is manufactured to include individual strings or thread strands interspersed throughout the felt material. In arranging felt strips 46 made from F3 veined felt, the felt should be cut and positioned such that the strings are oriented approximately perpendicular to the surface being lubricated, i.e., to top surface 18T and bottom surface 18B of sheet metal stock 18. Another type of felt appropriate for use with embodiments of the present invention is F2 veined felt.

Figure 3:
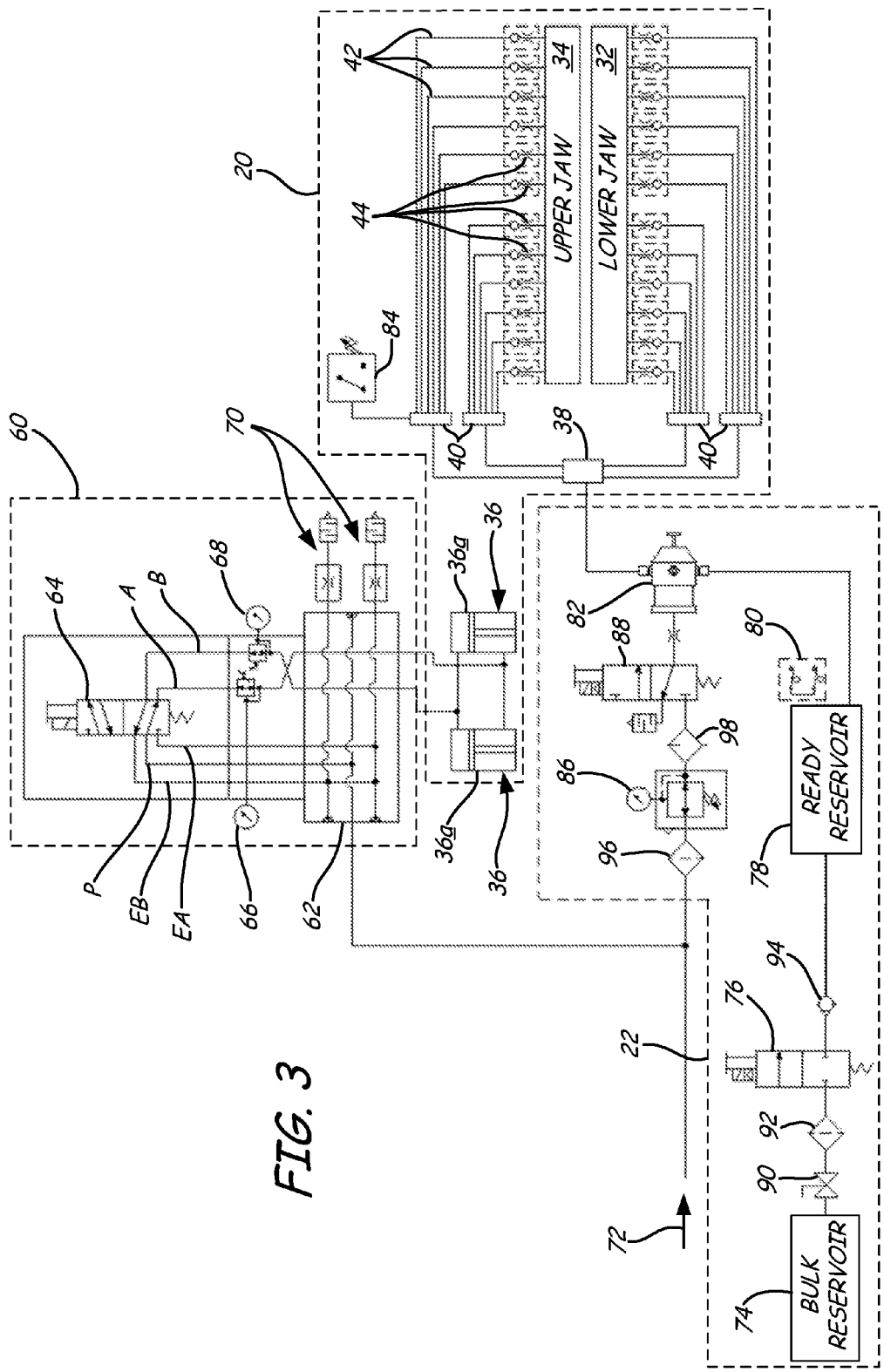
FIG. 3 is a schematic illustrating the control and operation of the lubrication system shown in FIG. 1.

FIG. 3 is a schematic illustrating, in greater detail, the control and operation of lubrication system 16. Controller 24 is not shown in FIG. 3, however, it will be apparent from the following description which components of lubrication system 16 are monitored and/or controlled by controller 24 and how these controls are relevant in the operation of system 16. FIG. 3 shows lubricating head 20 of lubrication system 16 and lubricant supply system 22. FIG. 3 also shows pneumatic system 60, which is configured to drive actuators 36 to lower and raise lubricating head 20 into and out of engagement with sheet metal stock 18 (shown in FIG. 1).

Lubricating head 20 is lowered and raised into and out of engagement with sheet metal stock 18 (shown in FIG. 1) by actuators 36, which are driven by pneumatic system 60. Pneumatic system 60 includes manifold 62, solenoid valve 64, first regulator 66, second regulator 68, and exhausts 70. Manufacturing facilities in which embodiments of the present invention may be employed will commonly have a supply of pressurized air. Such an air supply is represented in FIG. 3 and described herein as plant air supply 72. However, the pressurized air can also be supplied by, for example, a compressor connected directly to pneumatic system 60 and lubricant supply system 22.

In FIG. 3, plant air supply 72 is connected to manifold 62 of pneumatic system 60. From manifold 62, plant air supply 72 is connected to solenoid valve 64 by supply line P. Solenoid valve 64 is controlled by controller 24 to switch plant air supply 72 between supply lines A and B. Supply lines A and B connect to cylinders 36a of actuators 36 through first and second regulators 66, 68, respectively. Therefore, by controlling solenoid valve 64, which can be either normally on or normally off, controller 24 can direct plant air supply 72 to line A to raise cylinders 36a and thereby upper jaw 34 of lubricating head 20, or to line B to lower cylinders 36a and thereby upper jaw 34 of lubricating head 20. Regulator 66 is connected between solenoid valve 64 and cylinders 36a to control the pressure of the air delivered to cylinders 36a through supply line A and thereby control the pressure at which upper jaw 34 is raised. Plant air supply 72 can be delivered at pressures including, for example, between approximately 5.6-7.0 kg/cm² (80-100 psi), but it may be necessary or desirable to raise upper jaw 34 at a different pressure including, for example, approximately 2.8 kg/cm² (40 psi). Regulator 66 can therefore be set to 2.8 kg/cm² (40 psi) to reduce the pressure of plant air supply in line A before reaching cylinders 36a. Similarly, regulator 68 is connected between solenoid valve 64 and cylinders 36a to control the pressure of the air delivered to cylinders 36a through supply line B and thereby control the pressure at which upper jaw 34 is lowered. As with regulator 66, regulator 68 can be employed to lower upper jaw 34 at a different pressure than plant air supply 72 including, for example, approximately 1.4 kg/cm² (20 psi). Employing first and second regulators 66, 68 provides separate control for raising and lowering upper jaw 34 of lubricating head 20. Regulators 66, 68 can be mechanical and can therefore be set by, for example, manually adjusting each regulator 66, 68 to a target pressure. Regulators 66, 68 can also be electro-mechanical, in which case the setting and control of regulators 66, 68 can be managed by controller 24.

Lubricant supply system 22 is connected to and configured to deliver lubricant to lubricating head 20. Lubricant supply system 22 includes bulk reservoir 74, solenoid valve 76, ready reservoir 78, reservoir refill switch 80, pump 82, and lubricant pressure switch 84, and third regulator 86 and solenoid valve 88. In FIG. 3, bulk reservoir 74 is connected to ready reservoir 78 through solenoid valve 76. Ready reservoir 78 is connected to pump 82, which is configured to deliver lubricant from ready reservoir 78 to lubricating head 20. As shown in FIG. 3, lubricant supply system 22 can also include shut off valve 90 and oil filter 92 between bulk reservoir 74 and solenoid valve 76, and check valve 94 between solenoid valve 76 and ready reservoir 78. Bulk reservoir 74, similar to plant air supply 72, can be a central store of lubricant that is used for an entire manufacturing facility and to which lubricant supply system 22 is connected. Ready reservoir 78 is the lubricant supply for lubrication system 16, which periodically is replenished by bulk reservoir 74. Connected to ready reservoir 78 is reservoir refill switch 80. Refill switch 80 can be configured with a high and low setting and thereby can signal both when the ready reservoir 78 has reached a threshold low level of lubricant and a threshold high level of lubricant. For example, as lubrication system 16 operates it consumes lubricant from ready reservoir 78. Refill switch 80 can be activated when a threshold level of lubricant in ready reservoir 78 is reached during operation of lubrication system 16. Controller 24, which is monitoring refill switch 80, receives a signal from refill switch 80 that the threshold low lubricant level has been reached in ready reservoir 78. Controller 24 then activates solenoid valve 76 to open the connection between bulk reservoir 74 and ready reservoir 78. Ready reservoir 78 is replenished by bulk reservoir 74 until a threshold high level of lubricant is reached in ready reservoir 78, at which time refill switch 80 is activated again and controller 24 closes solenoid valve 76.

Plant air supply 72 is not only connected to pneumatic system 60, but also to lubricant supply system 22. As shown in FIG. 3, air supply 72 is connected to and drives pump 82 through third regulator 86 and solenoid valve 88 of lubricant supply system 22. Lubricant supply system 22 can also include air filter 96 between air supply 72 and third regulator 86, and air tool lubricator 98 between third regulator 86 and solenoid valve 88. As discussed with reference to pneumatic system 60, plant air supply 72 can be delivered at a pressure higher than what is desirable or necessary to drive pump 82. Third regulator 86 can therefore be used to control the pressure of air delivered to pump 82 through solenoid valve 88. For example, third regulator 86 can lower plant air supply 72 delivered at between approximately 5.6-7.0 kg/cm² (80-100 psi) to approximately 4.2 kg/cm² (60 psi). Solenoid valve 88 can be opened and closed by controller 24 to activate pump 82. Pump 82 delivers lubricant, e.g., oil, through first and second manifolds 38, 40 and supply lines 42 to orifices 44 on lower and upper jaws 32, 34 of lubricating head 20. Pump 82 can be, for example, a pneumatic cylinder that is driven by air supply 72 controlled by regulator 86. Pump 82 can be set to deliver a prescribed volume of lubricant to lubricating head 20 each time it is activated and the frequency at which pump 82 is activated can be set and controlled by controller 24. As lubricant supply system 22, in particular, pump 82, delivers lubricant to lubricating head 20, lubricant pressure switch 84 measures the pressure of lubricant delivered to lubricating head 20. Lubricant pressure switch 84 can be set with a high and low pressure threshold to generally monitor/signal pressure dips and spikes in lubricating head 20. For example, debris in the lubricant may build up in or completely block one or more of orifices 44, resulting in a pressure spike as the prescribed volume of lubricant is effectively forced through a fewer number of exhaust points. Controller 24 can monitor pressure switch 84 and function to cease lubricant delivery to lubricating head 20, or otherwise initiate an alert, in the event, for example, the high pressure threshold is reached. One pressure switch appropriate for use with embodiments of the present invention is the Model 33D Solid-State Pressure Switch manufactured by Norgren Inc. of Littleton, Colo.

As illustrated in FIG. 3, therefore, pneumatic system 60 drives actuators 36, in particular cylinders 36a to lower and raise lubricating head 20 into and out of engagement with sheet metal stock 18. Once lubricating head 20 engages sheet metal stock 18, lubricant supply system 22, and in particular pump 82, delivers lubricant to felt strips 46 that wipe lubricant onto sheet metal stock 18. A supply of lubricant for delivery to lubricating head 20 and lubrication of sheet metal stock 18 is provided by one or more reservoirs including, for example, bulk reservoir 74 and ready reservoir 78. Operation of lubrication system 16 is facilitated by controller 24, which monitors and/or controls pneumatic system 60 to move lubricating head 20, the supply and refilling of lubricant reservoirs (74, 78) in lubricant supply system 22, the delivery of lubricant to lubricating head 20 by pump 82, and the pressure of lubricant in lubricating head 20.

Embodiments of the present invention have several advantages over prior lubrication systems and methods used on heat exchanger fin sheet stock. Instead of being directed at removing excess oil from the stock, embodiments of the present invention apply the correct amount of oil distributed over the stock at the correct thickness. Lubrication systems and methods according to the present invention are therefore less prone to excessive lubricant waste and have greater effectiveness at thinner lubricant film thicknesses including, for example, film thicknesses less than approximately 0.0254 mm (0.001 inches). Embodiments of the present invention provide a significantly improved degree of control over the lubrication process by providing direct control over lubricant volume and pressure, as well as the frequency at which the lubricant is delivered to the lubricating head.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A lubrication system for heat exchanger fin stock comprises:
   a head configured to receive the fin stock, the head including:
      a stationary lower jaw fixed to a base; and
      an upper jaw movable relative to the lower jaw, the fin stock receivable between the lower jaw and the upper jaw, each of the lower jaw and the upper jaw including a strip of non-abrasive material connected thereto and configured to absorb a lubricant and wipe the lubricant onto a surface of the fin stock;
   an actuator secured to the base and to the upper jaw and configured to apply force to the upper jaw to both move the upper jaw in a linear direction relative to the lower jaw into engagement with the fin stock and move the upper jaw out of engagement with the fin stock;
   a first pressure regulator operably connected to the actuator and configured to control a first pressure at which upper jaw is moved out of engagement with the fin stock;
   a second pressure regulator separate from the first regulator operably connected to the actuator and configured to control a second pressure at which the upper jaw is moved into engagement with the fin stock; and
   a controller configured to control both operation of the actuator and a replenishable supply of the lubricant delivered to the strip of non-abrasive material.

2. The lubrication system of claim 1 further comprising a lubricant supply system configured to deliver the lubricant to the strip of non-abrasive material.

3. The lubrication system of claim 2, wherein the lubricant supply system comprises:
   a pump operatively connected to the supply reservoir and configured to deliver the lubricant to the strip of non-abrasive material.

4. The lubrication system of claim 3 further comprising a filter interposed between the lubricant supply and the pump.

5. The lubrication system of claim 1 further comprising a manifold connected to the head and configured to deliver the lubricant to the strip of non-abrasive material at a plurality of locations.

6. The lubrication system of claim 5, wherein the locations at which the lubricant is delivered are approximately equally distributed across a length of the strip of non-abrasive material.

7. The lubrication system of claim 5, wherein a distance between each of the locations at which the lubricant is delivered is equal to approximately 76.2 mm (3 inches).

8. The lubrication system of claim 1, wherein the controller is configured to control a pressure at which the lubricant is delivered from the supply to the strip of non-abrasive material.

9. The lubrication system of claim 1, wherein the controller is configured to control a volume of the lubricant delivered from the supply to the strip of non-abrasive material.

10. The lubrication system of claim 1, wherein the controller is configured to control an amount of the lubricant stored in the supply.

11. The lubrication system of claim 1, wherein the controller is configured to control replenishment of the supply of lubricant.

12. The lubrication system of claim 1, wherein the controller is configured to control a frequency at which the lubricant is delivered from the supply to the strip of non-abrasive material.

13. The lubrication system of claim 1, wherein the strip of non-abrasive material comprises a strip of felt.

14. The lubrication system of claim 1 further comprising a second strip of non-abrasive material connected to the head in parallel with the first strip of non-abrasive material and configured to absorb the lubricant and wipe the lubricant onto a surface of the fin stock opposite the surface wiped by the first strip of non-abrasive material.

* * * * *